Nov. 22, 1949     E. V. SCHAAL     2,488,642
WINDSHIELD CLEANER
Filed Oct. 4, 1945
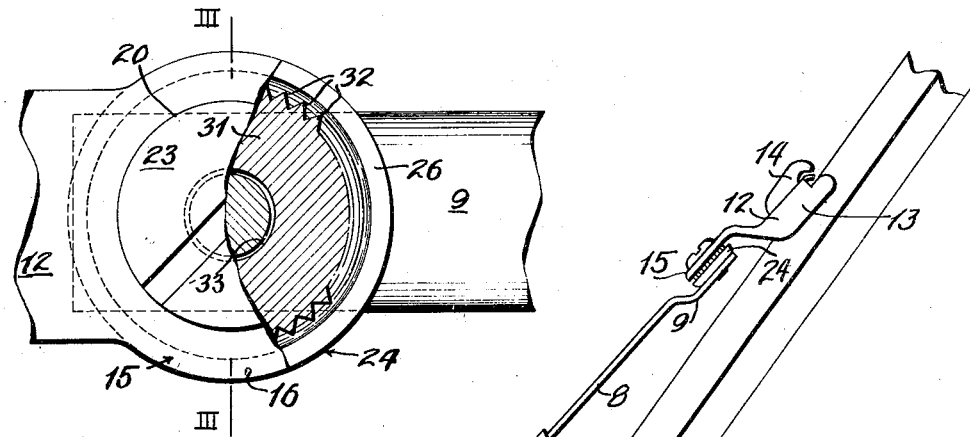
Fig.2     Fig.1
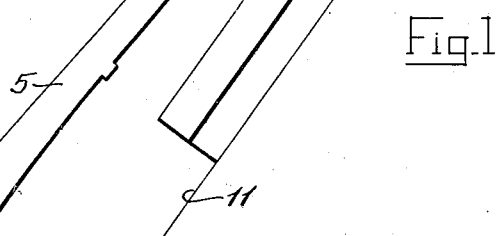
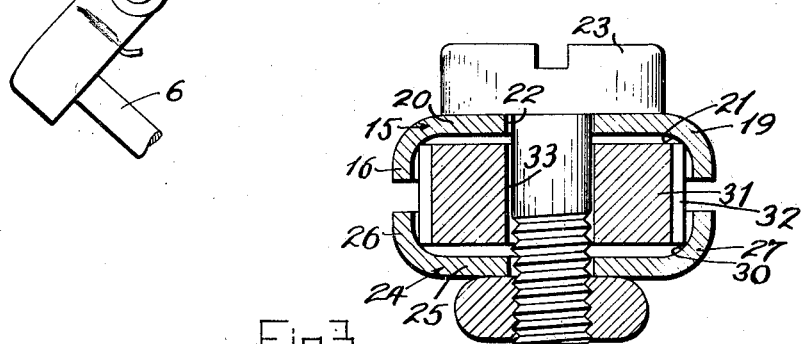
Fig.3
INVENTOR
Earl V. Schaal
BY Bean, Brooks, Buckley & Bean
ATTORNEY Patented Nov. 22, 1949

2,488,642

UNITED STATES PATENT OFFICE 2,488,642

WINDSHIELD CLEANER

Earl V. Schaal, East Aurora, N. Y., assignor to Trico Products Corporation, Buffalo, N. Y.

Application October 4, 1945, Serial No. 620,303

6 Claims. (Cl. 287—14)

1

The invention relates in general to the art of windshield cleaners, and particularly to the arms of such cleaners which are carried back and forth across the surface of the windshield.

The principal object of the invention has been to provide an arm for a windshield cleaner having an adjustable tip section, whereby the adaptability of the cleaner to the various styles and designs of windshields for motor vehicles may be facilitated.

A further object has been to provide a wiper arm with an adjustable tip section wherein the adjustability of the latter is secured in a reliable and effective manner against unauthorized displacement.

Moreover, it has been an object to provide an adjustable wiper arm which will permit sensitive adjustment of the wiper arm position.

In the drawings:

Fig. 1 is a side elevation of a wiper arm embodying the invention and showing it supporting a wiper blade;

Fig. 2 is an enlarged fragmentary plan view of the arm; and

Fig. 3 is an enlarged sectional view taken on line III—III of Fig. 2.

Referring to the drawings, 5 represents a windshield cleaner arm which is carried by the oscillating shaft 6 of the windshield cleaner mechanism. The arm shown comprises an arm section 8 provided with an offset portion 9 at its outer end. The windshield wiper blade is represented at 10 and is shown in engagement with the surface 11 of a vehicle windshield. An adjustable tip portion 12 is carried by the offset portion 9 and is formed at its outer end with the customary spaced attaching ears 13 for engagement with the attaching tab 14 of the wiper blade.

The inner end of the tip section 12 is provided with a cup-shaped disk 15 having an outturned peripheral edge 16 connected to the base 20 thereof preferably by a conical wall 19 having an inwardly converging surface portion 21 which may be inclined or curved, as shown. The base portion 20 is formed with an aperture 22 for passage of a clamping screw 23 which is screwthreaded into the offset portion 9 of the arm section 8. A cup-shaped disk 24 is fixed to the offset portion 9, the same having a base portion 25, perforated to pass the screw 23, and an outturned peripheral edge portion 26 connected to the base portion by an inwardly converging wall 27 having a conical surface 30 with a contour preferably similar to that of the surface 21 for coaction therewith, as will appear hereinafter.

2

The peripheral edge portion 16 and 26 of the disks 15 and 24, respectively, face each other and form a substantially closed chamber for receiving the lock washer 31. This lock washer is preferably of cylindrical disk shape and is formed on its periphery with a plurality of ridges 32. The ridges are preferably V-shaped and substantially coplanar with the axis of the disk, although they could be arranged at an angle with the axis. The ridges extend from one face of the disk-like washer body to the other and thereby form an annular series of V-shaped teeth in the plane of each face for biting engagement with the opposed cups 15 and 24. Each ridge therefore gives sustaining support to its terminal teeth. The outer diameter of the washer teeth is such as to engage the inwardly converging surfaces 21 and 30, respectively, at such points that there will be clearance between the washer and the base portions of the disks, thus insuring biting contact of the teeth with the cups. Since the points of contact of the teeth with the disks lie outwardly beyond the direct clamping pressure of the screw on the central areas of the base portions 20 and 25, the disks will be placed under spring tension when the screw is tightened, thereby guarding against the parts loosening by vibration. The washer 31 is preferably hardened while the material of the disks is relatively soft, so that the teeth will embed themselves in the engaged surfaces of the disks to thereby firmly hold the disks, and the attached tip and arm sections, in adjusted positions. Further, the washer 31 is provided with a centrally arranged aperture 33 for passage of the screw 23, and this aperture is preferably slightly enlarged, whereby the washer will be permitted to float to adjust itself with the coacting inwardly converging surfaces of the disks, thus preventing the washer from binding upon the screw.

Obviously, when the tip section has been adjusted to the correct angle with the arm section, the screw 23 will serve to clamp the disks down upon the washer and to draw the teeth thereof into biting contact with the relatively ductile inwardly converging surfaces of the engaged cups 15 and 24.

Instead of inwardly converging walls 19 and 27 of the cup-shaped disks being curved in form, they may be conical or take any shape which will cause the V-shaped teeth of the lock washer to engage in the manner aforesaid the surfaces thereof upon relative axial clamping movement of the coacting parts. These and other modifications may be made without departing from the spirit of the invention or the scope of the appended claims, the form shown being merely a preferred embodiment of the invention.

What is claimed is:

1. A wiper arm having a pair of sections formed with opposed cupped portions, a lock washer engaged in the cupped portions, said washer having rigidly related and oppositely facing sets of teeth about the margins of the opposite faces thereof with the teeth biting into the cupped portions, the bottoms of the cupped portions being spaced from the side faces of the washer and resiliently yieldable with respect thereto, and means exerting clamping pressure on said bottoms within the annular series of biting teeth whereby the bottoms may resiliently give under the clamping pressure with respect to the teeth.

2. A wiper arm comprising a body section, and an adjustable tip section, a coacting cup rigidly carried by each of said sections in opposition to the companion cup, each cup being formed with an outwardly flaring wall, a circular lock washer disposed between said cups and having peripheral serrations paralleling the axis of the washer and forming marginal teeth projecting into locking engagement with said walls, and means for clamping said washer between said cups to cause said washer teeth to engage the walls thereof in biting engagement.

3. A wiper arm comprising a body section, and an adjustable tip section, a cupped disk member rigidly carried by each of said sections, each disk member being formed with a base portion joined by a flaring part to an upstanding peripheral wall, a lock washer disposed between the base portions of said disk members and having peripheral serrations providing marginal teeth on opposite sides projecting into locking engagement with the flaring parts, and screw means engaging the base portions of said disk members and passing through an enlarged aperture formed in said washer, whereby said washer may float to adjust itself as the teeth bite into said flaring parts.

4. A wiper arm comprising a body section, and an adjustable tip section, a coacting disk member rigidly carried by each of said sections, each disk member having a base portion and a turned peripheral edge joined to said base portion by a curve-shaped wall and arranged adjacent the edge of the opposite disk member, a lock washer disposed between said disk members and formed with rigidly supported serrations for biting engagement with the curve-shaped wall of each of said disk members, and means for clamping said washer between said disk members.

5. A wiper arm comprising a body section, and an adjustable tip section, a coacting disk member rigidly carried by each of said sections, each disk member being formed with an inwardly converging peripheral wall positioned to face the wall of the opposite disk, a lock washer disposed between said disk members and formed on its periphery with a plurality of ridges extending across its peripheral edge to form sharpened end portions which are sustained under pressure by the intermediate portions thereof, and fastening means for clamping said washer between said disk members to cause the ends of said ridges to be drawn into biting engagement with said disk members.

6. A wiper arm comprising a body section, and an adjustable tip section, a coacting disk member rigidly carried by each of said sections, each disk member being formed with an inwardly converging peripheral wall positioned to face the wall of the opposite disk, a lock washer disposed between said disk members and formed across its periphery with a plurality of V-shaped ridges arranged coplanar with the axis of the washer and exposing the opposite sharpened ends of each ridge for being sustained under pressure by the intermediate portion thereof, and fastening means for clamping said washer between said disk members to cause the edges of said ridges to be drawn into biting engagement with said disk members.

EARL V. SCHAAL.

REFERENCES CITED

The following references are of record in the file of this patent:

UNITED STATES PATENTS

| Number | Name | Date |
| --- | --- | --- |
| 589,351 | Humbach | Aug. 31, 1897 |
| 2,392,670 | Horton | Jan. 8, 1946 |